US009847968B2

(12) United States Patent
Beauchesne et al.

(10) Patent No.: US 9,847,968 B2
(45) Date of Patent: Dec. 19, 2017

(54) METHOD AND SYSTEM FOR GENERATING DURABLE HOST IDENTIFIERS USING NETWORK ARTIFACTS

(71) Applicant: Vectra Networks, Inc., San Jose, CA (US)

(72) Inventors: Nicolas Beauchesne, Miami Beach, FL (US); Monty Sher Gill, San Jose, CA (US); Oliver Kourosh Tavakoli, Monte Sereno, CA (US)

(73) Assignee: Vectra Networks, Inc., San Jose, CA (US)

( * ) Notice: Subject to any disclaimer, the term of this patent is extended or adjusted under 35 U.S.C. 154(b) by 206 days.

(21) Appl. No.: 14/644,187

(22) Filed: Mar. 10, 2015

(65) Prior Publication Data

US 2015/0312211 A1 Oct. 29, 2015

Related U.S. Application Data

(60) Provisional application No. 61/951,096, filed on Mar. 11, 2014.

(51) Int. Cl.
*G06F 15/173* (2006.01)
*H04L 29/12* (2006.01)
*H04L 12/891* (2013.01)
*H04L 29/06* (2006.01)

(52) U.S. Cl.
CPC .......... *H04L 61/2069* (2013.01); *H04L 47/41* (2013.01); *H04L 61/15* (2013.01); *H04L 61/35* (2013.01); *H04L 61/6004* (2013.01); *H04L 63/1408* (2013.01); *H04L 61/6022* (2013.01)

(58) Field of Classification Search
USPC .................................................. 709/238, 224
See application file for complete search history.

(56) References Cited

U.S. PATENT DOCUMENTS

| 7,447,768 | B2 | 11/2008 | Kelly et al. | |
|---|---|---|---|---|
| 8,077,718 | B2 | 12/2011 | Mortier et al. | |
| 2002/0091811 | A1* | 7/2002 | Schweitzer | H04M 15/31 709/223 |
| 2008/0244744 | A1 | 10/2008 | Thomas et al. | |

(Continued)

FOREIGN PATENT DOCUMENTS

GB 2450897 A 1/2009

OTHER PUBLICATIONS

International Search Report & Written Opinion dated Jun. 15, 2015 for PCT Appln. No. PCT/US15/19799.

(Continued)

*Primary Examiner* — Hee Soo Kim
(74) *Attorney, Agent, or Firm* — Vista IP Law Group, LLP

(57) ABSTRACT

A host identification engine receives network traffic from a network and uses one or more artifact extractors to extract artifact data items that can identify a host. The artifact data items can be stored in a host signature database. Network addresses to which the hosts correspond can be stored in a network address database. A mapping table can be implemented to match the data in the signature database and network database to generate durable host identification data that can accurately track hosts as they use different identification data and/or move between hosts.

30 Claims, 10 Drawing Sheets

(56) References Cited

U.S. PATENT DOCUMENTS

2009/0144419 A1\* 6/2009 Riordan ............. H04L 12/2602
                                                        709/224

OTHER PUBLICATIONS

International Preliminary Report on Patentability dated Sep. 13, 2016 for PCT Appln. No. PCT/US15/19799.
Extended European Search Report dated Sep. 21, 2017 for EP Appln. No. 15760752.4.
Richtj999: "Tracking web traffic within my network by mac address—Spiceworks", i5 Jan. 2014 (Jan. 15, 2014), pp. 1-5, XP055406295, Retrieved from the Internet: URL:https://community.spi ceworks.comltopi c /429545-tacking-web-traffic-within-my-net work-by-mac-address [retrieved on Sep. 13, 2017].
Anonymous: "MAC Address Tracking—FireRack Home", Jan. 14, 2007 (Jan. 14, 2007), pp. 1-2, XP055406449, Retrieved from the Internet: URL:https://web.archive.org/web/20070114060626/http://www.firerack.com:80/features/FMS/mac-tracking [retrieved on Sep. 13, 2017].

\* cited by examiner

METHOD AND SYSTEM FOR GENERATING DURABLE HOST IDENTIFIERS USING NETWORK ARTIFACTS

CROSS-REFERENCE TO RELATED APPLICATION(S)

The present application claims the benefit of U.S. Provisional Application Ser. No. 61/951,096, filed on Mar. 11, 2014, titled "DETERMINING HOST IDENTITY VIA MULTIPLE CAPTURED ARTIFACTS", the content of the aforementioned application is hereby incorporated by reference in its entirety.

BACKGROUND

Determining the identity of hosts on a network is an important capability of security appliances that intend to track behavior of hosts over extended periods of time. Network hosts (e.g. servers, laptops, mobile devices) are commonly identified by their Internet Protocol (IP) address, Media Access Control (MAC) address, host name, or other identifiers. However, often a given host's IP address may change as the host connects at different times and/or from different locations, for instance. Further, one or more host names may be duplicates. For example, three users with identical cell phones may all share the same host name (e.g. "iPhone"). Increasingly, company networks allow users to "bring your own device" (BYOD) to work, which may further create host naming duplications. As such, there is a demand for accurately establishing a consistent mechanism of identifying a particular host that appropriately handles shared host names, hosts changing networks, and other complexities.

While some conventional approaches rely on information provided to the security appliance from external sources (in either a "pull" model, where the security appliance queries the external sources, or a "push" model, where such information is pushed by the external source into the security appliance), these approaches are difficult to configure and maintain. Further, these approaches often only cover a subset of the hosts in a company's network. Further, malicious entities that attack networks often assume that network security defense devices are seeking to track the host by IP addresses. As such, the malicious entities commonly switch IP addresses or spoof other identification data in an effort to stymie the network security devices.

As is evident, there is a demand for a host identification mechanism that can efficiently and accurately identify hosts over time, in different networks, and/or hosts that use spoofed identifiers.

SUMMARY

The disclosed embodiments provide approaches for using a host ID engine to passively generate durable host identities that are not easily spoofed and remain accurate even if the host switches network, devices, or other complexities arise. In some embodiments, a host ID engine generates durable host ID by extracting a number of artifacts from network traffic. The artifacts may be used as data describing a host. Further, in some embodiments, artifacts that remain relatively stable over time may be extracted from certain packets in certain network protocols used by hosts. In some embodiments, the durable host IDs may be stored in persistent storage as durable host ID data, which may be updated over time.

In some embodiments, the host ID engine may detect individual host use of a network address by matching observed artifacts associated with the network address to portions of the durable host ID and/or by correlating the occurrence of their durable host ID over varying time periods. In some embodiments, the host ID engine may detect artifacts, which correspond to durable host IDs that already exist. In those cases, the host ID engine may update the durable host ID with new artifact data.

In some embodiments, durable host IDs may allow the security staff to conduct historical analysis and track hosts as they move from one network to the next, or reconnect at different times. In some embodiments, the host ID engine may maintain a network address database comprising a mapping of host network addresses (e.g. IP and/or MAC addresses) and host durable IDs across different periods of time.

Other additional objects, features, and advantages of the invention are described in the detailed description, figures, and claims.

DETAILED DESCRIPTION

Various embodiments of the invention are directed to a method, system, and computer program product for implementing host identification. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Figure 1A:
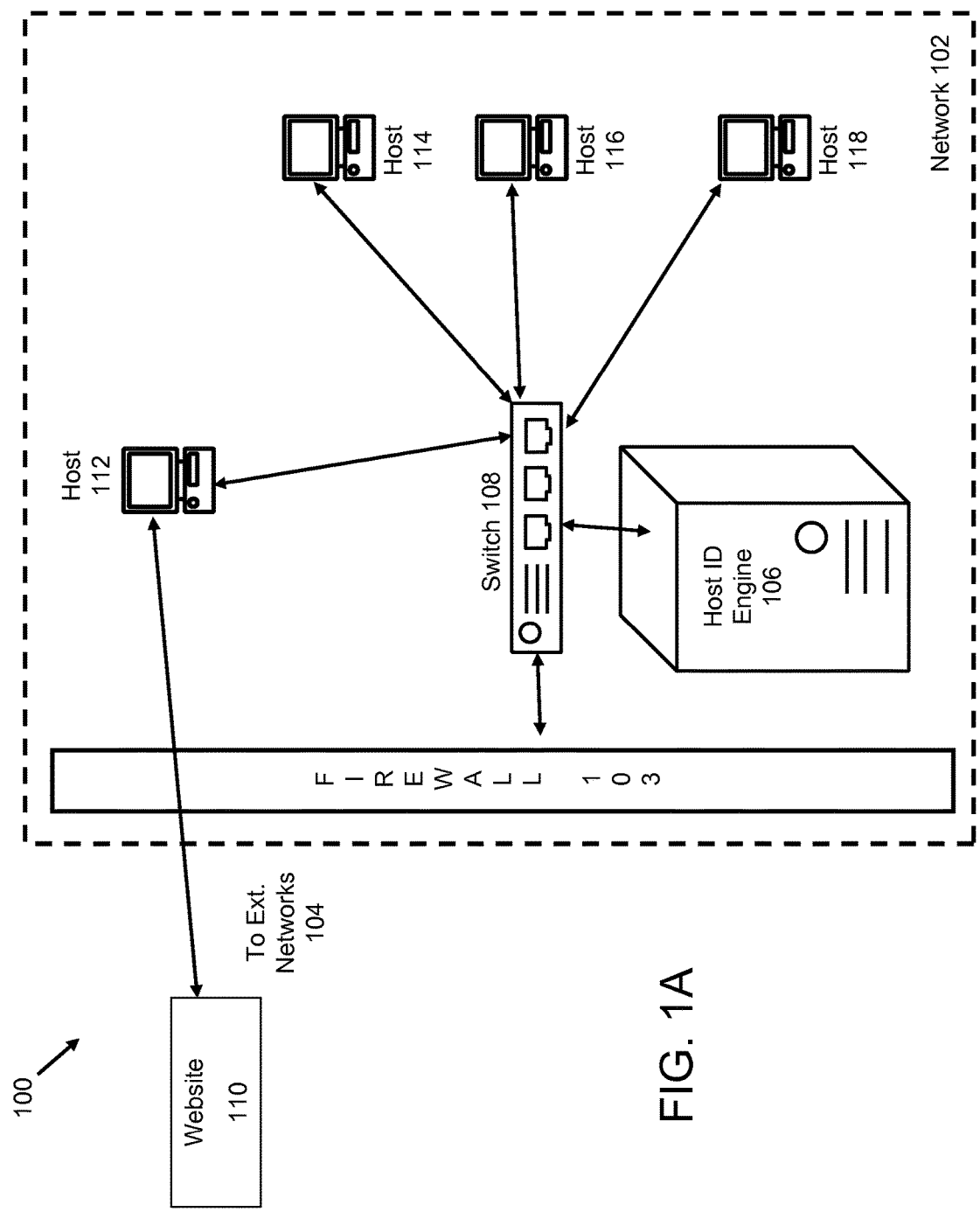
FIG. 1A-B illustrate an example environment in which a host identification (ID) engine may be implemented to perform host identification, as according to some embodiments.

FIG. 1A illustrates an example environment 100 in which a host identification (ID) engine 106 may be implemented to generate network host identification data (e.g. durable host IDs), as according to some embodiments. There, an example network 102 environment comprises one or more hosts (e.g. assets, clients, computing entities), such as host entities 112, 114, 116, and 118, that may communicate with one another through one or more network devices, such as a network switch 108. The network 102 may communicate with external networks 104 through one or more network border devices as are known in the art, such as a firewall 103. For instance, host 112 may contact external hosts (e.g. hosts running external website 110) through network protocol such as TCP/IP, which for example, involve HTTP requests and responses. Thus, as illustrated in this example, hosts may be protected within the network 102.

In some embodiments, the host ID engine 106 enables network traffic to be analyzed, parsed into session datasets, and behavior (e.g. pattern) detection analysis performed on hosts in the network. In some embodiments, as illustrated, the host ID engine 106 may tap (e.g. TAP/SPAN) the network switch 108 to passively analyze the network traffic in a way that does not harm or slow down the network (e.g. by creating a copy of the network traffic for analysis). In some embodiments, the host ID engine is an external module that is coupled to the switch 108. While in some embodiments, the host ID engine may be directly integrated into network components, such as a switch 108 or a firewall 103. While still, in some embodiments the host ID engine may be integrated into one or more hosts (e.g. 118) in a distributed fashion (e.g. each host may have its own set instructions, the hosts collectively agree to follow or adhere to the instruction to collect information and report information to one another or the database to collectively work as a detection engine). Still in some embodiments, the host ID engine may be integrated into a single host (e.g. host 112) that performs host ID actions for the network 102.

In some embodiments, the network 102 may also include one or more infected hosts, e.g. host 112 infected with malware. Typically, the infected hosts are running software installed without the direct knowledge of the end user of the host or the IT organization for the company that owns both the network and the machine connected to it. In some embodiments, different forms of infection (e.g. infections from network attack), such as viruses, trojans, or worms, that infect the hosts display different types of activity patterns. In some embodiments, as described in further detail below, the host ID engine 106 can use schemes to identify hosts using artifacts that consistently identify a given host, even if that host switches some identification parameters (e.g. a host reconnects using a different IP address than before, spoofs identification information).

As mentioned, in some embodiments the company network is protected by a firewall 103 that generally prevents external hosts (e.g. a computer associated with website 110) from being able to initiate connections to hosts in the company network. For example, an initial communication from website 110 to host 112 is forbidden/stopped by firewall 103.

Figure 1B:
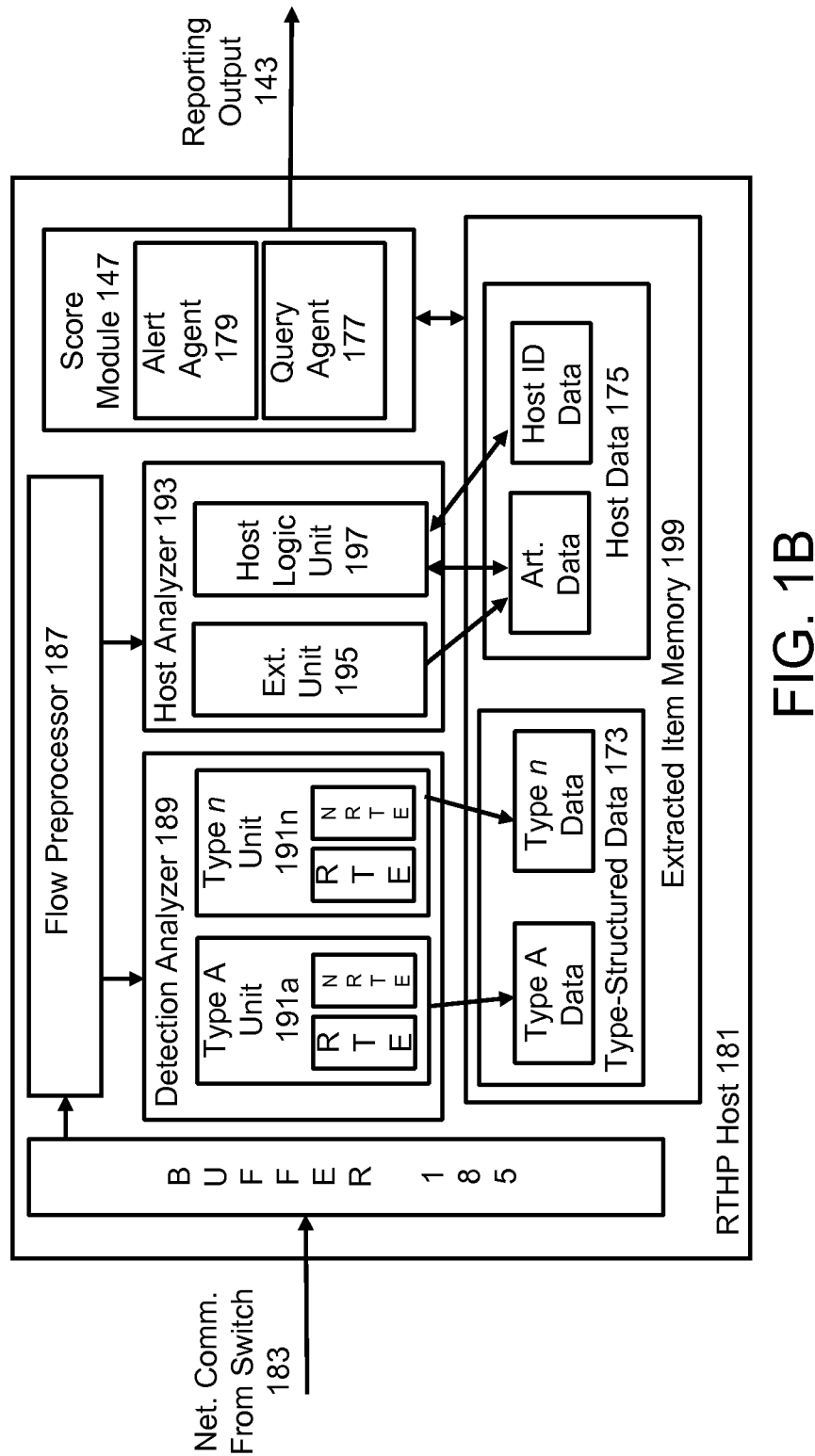

FIG. 1B illustrates an example system in which the approaches disclosed may be implemented. FIG. 1B shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191A may be designed for detecting relay communication attacks; for every type of relay communication detected, detection unit Type A 191 may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in, U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
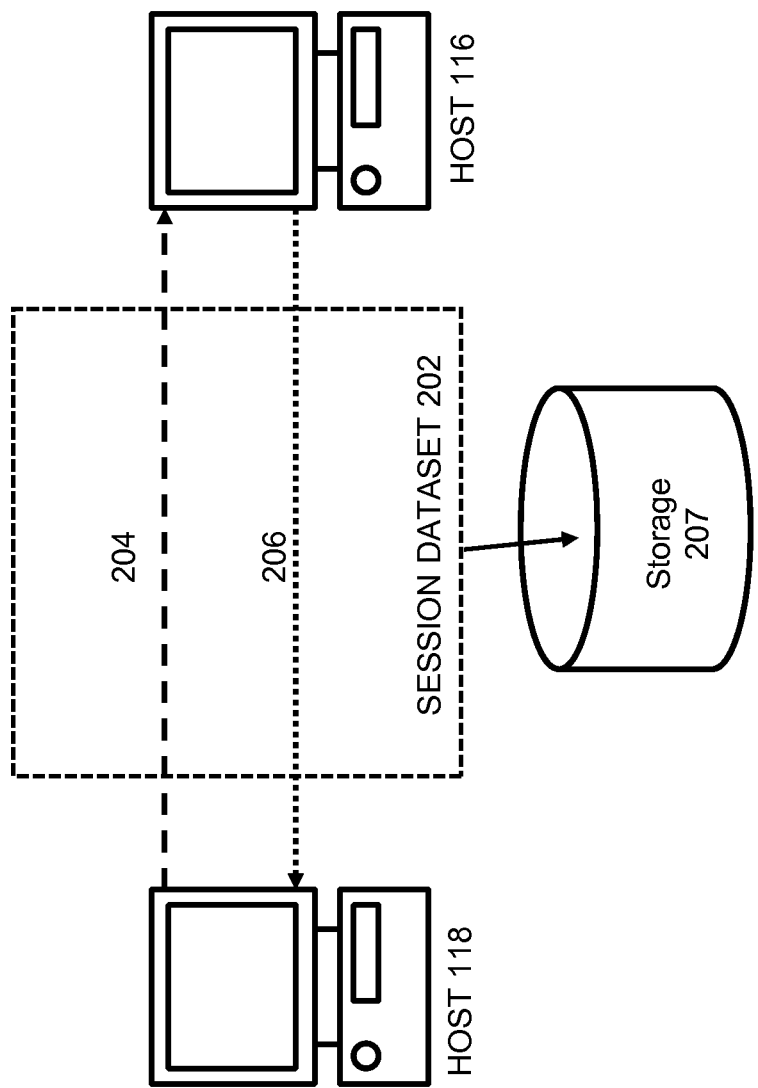
FIG. 2 illustrates a session dataset comprising one or more unidirectional flows between two computing entities, as according to some embodiments.

FIG. 2 illustrates a session dataset comprising one or more unidirectional flows between two computing entities, as according to some embodiments. As mentioned, in some embodiments the host ID engine 106 may perform host identification on network communications in a passive manner that does not slow down or harm network throughput. In some embodiments, the host ID engine 106 taps a network switch and receives copies of the network traffic for analysis. In some embodiments, the network communication flows between hosts inside or outside the network (e.g. received network traffic) are parsed into session datasets that may be stored for analysis. For example, as shown in FIG. 2, host 118 is communicating with host 116. First, host 118 generates a first communication flow dataset 204 (e.g. request, unidirectional data flow). Second, host 116 generates a second communication flow dataset 206 (e.g. response, unidirectional data flow). In some embodiments, a session dataset corresponds to one transaction or communication session between two hosts. In some embodiments, by examining packet contents (e.g. packet metadata, IP header, data/information transmitted in the unidirectional data flows), such as source and destination addresses, the host ID engine 106 may combine matching flows into a session dataset 302. However in some cases, a request (e.g. 204) is sent, but there is no reply (e.g. 206 does not occur). This may be because host 118 addressed its communications to a non-existent target, for example. Nonetheless, this communication may still be categorized a session dataset by the host ID engine 106. After identifying and categorizing one or more flows into a session dataset (e.g. 202), the host ID engine 106 may store session identifying data extracted from the session as a session artifacts in storage 207.

Figure 3:
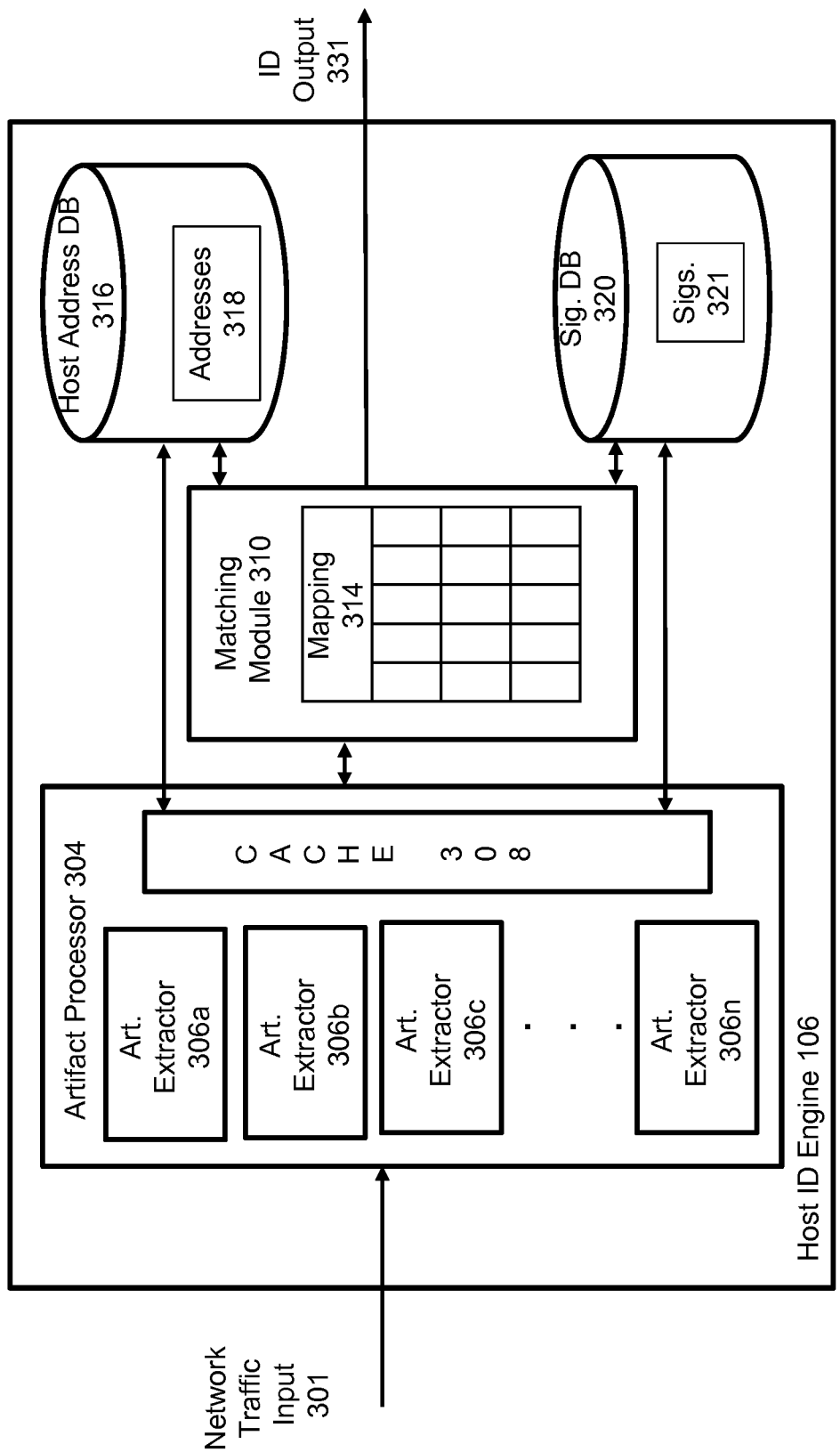
FIG. 3 shows an example architecture for the host ID engine.

FIG. 3 illustrates an example architecture for the host ID engine, as according to some embodiments. At 301, network traffic or session data may be provided to the host ID engine 106 as an input. At 304, an artifact processor comprises one or more artifact extractor units 306a-306n. As explained in further detail below, an extractor unit (e.g. 306a) is tuned to parse network traffic of a certain protocol and extract data items (e.g. artifacts) that may be used to identify a host and contribute to the generation of a durable host ID. In some embodiments, a durable host ID corresponds to a collection of artifacts that are extracted from a given host's communications. In some embodiments, the durable host ID may correspond to a key (e.g. a database key, primary key), which further corresponds to a collection of artifacts for a host. In some embodiments, the artifact extractors may store the extracted artifacts in an artifact cache 308 with a cache lifetime, which may transfer the artifacts to the matching module 310.

The matching module may correspond with a host address database 316 and a signature database 320 to generate a mapping or artifact table 314. In some embodiments, the artifact table comprises a mapping (e.g. durable host identification mapping data) between the durable host IDs artifacts and the host network addresses to which the artifacts correspond. That is, if a given artifact for a host on a given network address was retrieved at a certain time, the table 314 maps the artifact to the network address 318 and denotes (e.g. stores) the arrival time. In some embodiments, an identification (ID) output 331 or data relating to host ID queries (e.g. artifacts, past used network addresses, durable host IDs) may be provided from Host ID Engine 106. In some embodiments, the addition of artifacts and network addresses generate information clusters that may be used as a durable host ID. That is, for example, if a host uses only one network addresses but generates 50 matching artifacts from different protocols, a cluster of artifacts is formed around the network address. If the host changes its network address (e.g. uses a separate IP address) in an attempt to fool network security, the artifacts the host generates would still be similar to the artifacts generated in the past and the host is identified as the same host but using a different network address. In this way, the data clusters serve as a durable collection of identifiers which are difficult to dupe and provide historical analysis of how one or more hosts move around, use new network addresses, and generate new artifacts.

Figure 4:
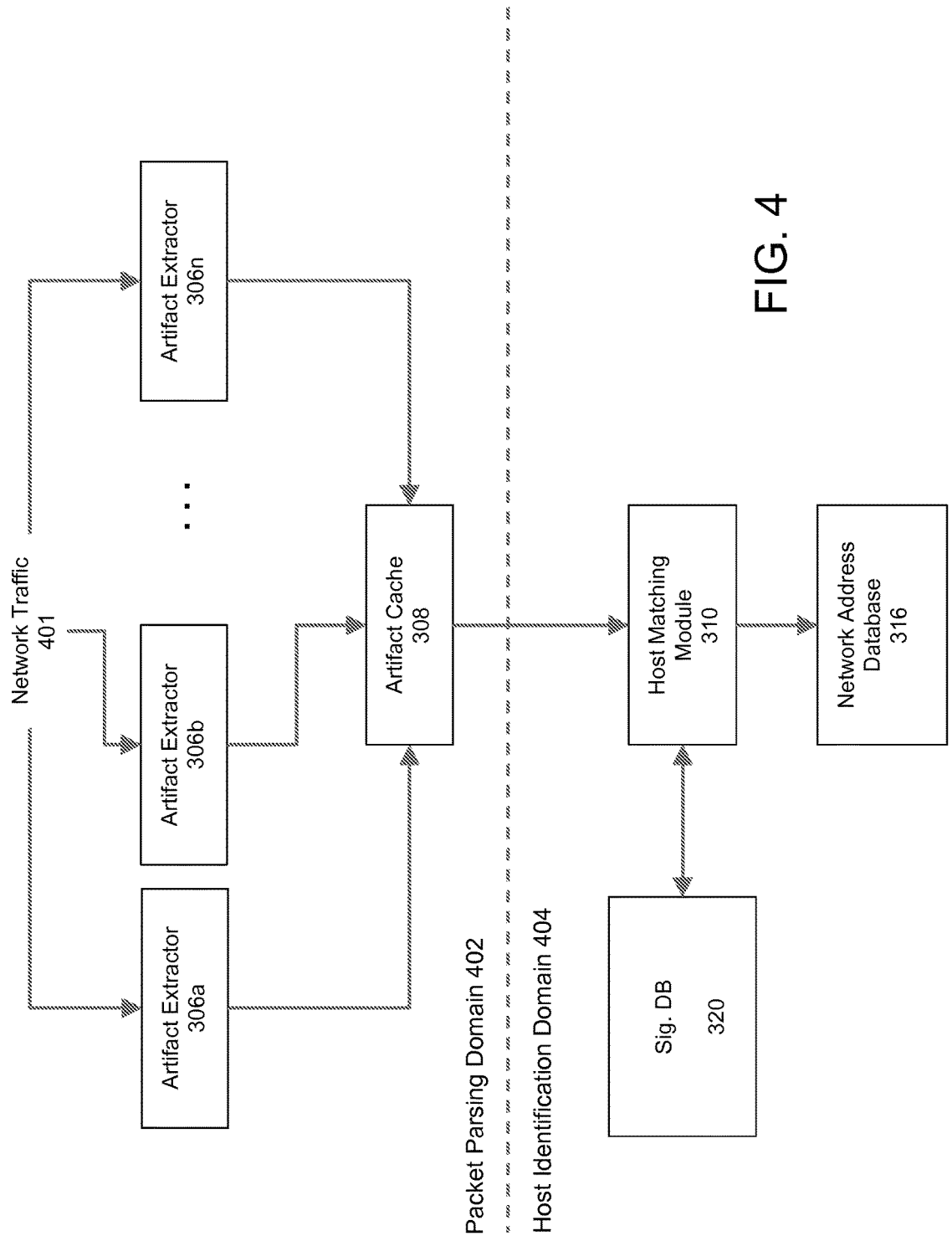
FIG. 4 shows a flowchart of an approach for implementing host identification.

FIG. 4 shows a flowchart of an approach for implementing host identification. In some embodiments, the host ID engine 106 accepts network packets (e.g. network traffic, session datasets) as input, parses the packets, extracts artifacts (e.g. identifying data), and organizes the artifacts into durable host IDs (e.g. host ID signatures), which may be used identify individual hosts. In some embodiments, the artifact extractors operate in the Packet Parsing Domain 402, where traffic with potentially interesting collect-able artifacts are processed, irrespective of the underlying transport mechanism to transfer packets. In some embodiments, the matching and storing of host identification related data occurs in the host identification domain 404.

Network packets or session datasets may be used at inputs at 401. The network traffic may be directed or routed to one or more artifact extractors 306a-306n, which are customized to parse traffic from different network protocols. That is, the artifact extractors may process a subset of network traffic of interest to each unit (e.g. 306a-306n). For instance, artifact extractor 306b may be a DHCP (Dynamic Host Control Protocol) extractor that is designed to process DHCP requests and responses.

In some embodiments, an artifact cache 308 may maintain copies of artifacts supplied to it by the artifact extractors 306a-306n. In some embodiments, extracted artifact data may be indexed by an IP address or MAC address (e.g. network address) to which the artifacts are attributed or correspond to. In some embodiments, each type of artifact data may be deleted from the artifact cache 308 after a fixed time (e.g. the cache lifetime). In some embodiments, when a host that has been identified by its network address is no longer present on the network (e.g. 102, FIG. 1), the corresponding artifacts for that network address are deleted from the artifact cache 308. This may occur in some embodiments in order to reduce the size of the artifact cache.

In some embodiments, if an artifact for a given network address is not already present in the artifact cache 308, then the cache may be updated with the new artifact. Additionally, the new artifact data may be provided to a host matching module at 310. In some embodiments, some hosts may already have a pre-existing or pre-generated durable host IDs. In some cases, if a sufficient collection of artifacts for a given network address exist to lead to a high likelihood of a match (such that the matching module 310 can match the network address to an existing durable host ID), the matching module may update the pre-existing durable host ID data in a signature database 320 with artifacts that are different or not already included in the existing durable host ID. Further, the matching module 310 may also store or update a mapping between the host's current network address and its durable host ID in a host network address database 316. In this way, when network security devices or other services request host identity data, a request can be made to the host address database 316 to request a mapping from network address to the host identity.

Figure 5:
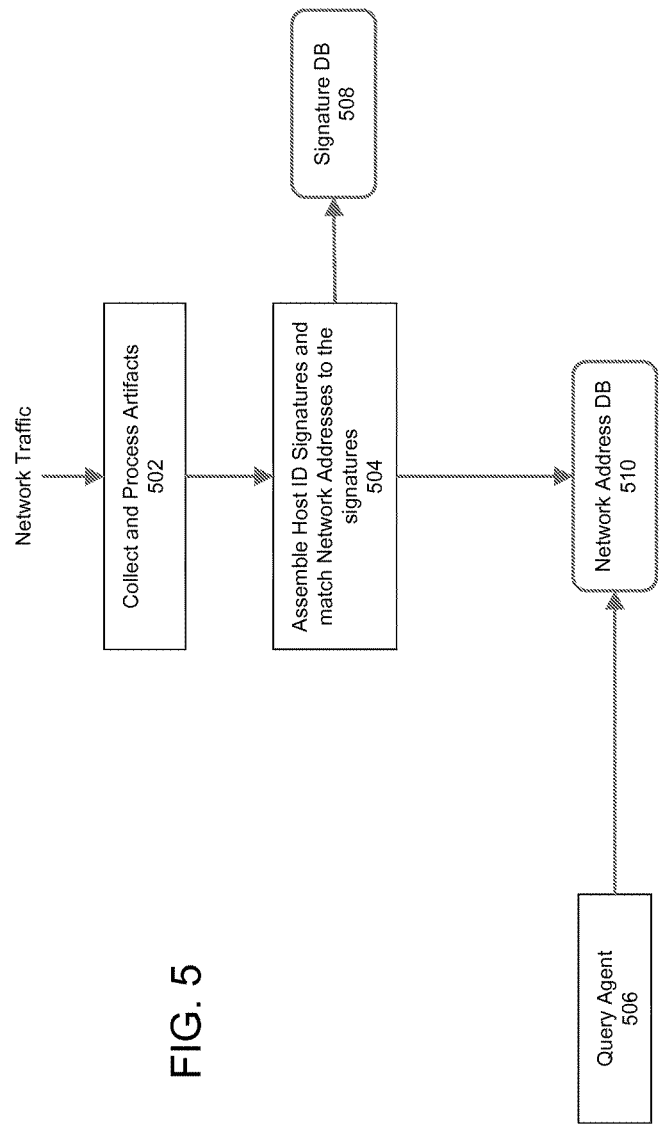
FIG. 5 shows a flowchart for an approach for processing durable host IDs and host network addresses.

FIG. 5 shows a flowchart for an approach for processing durable host IDs and host network addresses. In some embodiments, the host ID engine 106 receives a copy of network packets from a mirror port or TAP (Test Access Point) port or otherwise receives processed network traffic as one or more session datasets. At 502, the host ID engine may parse the network packets and extract artifacts. At 504, the artifacts may be organized into durable host IDs. In some embodiments, the artifacts are organized into clusters that correspond to the network address for a host from which the artifacts were collected or related to. At 508, the durable host IDs may be written to persistent storage (e.g. host signature database 320) to ensure their availability in the future. At 510, the durable host IDs may also be used to find a matching network address (which is emitting or receiving packets containing artifacts or is mentioned in packets sent or received by other hosts) to previously assembled durable host IDs and update a host network address database. Further, in some embodiments, at 506 a query agent may query the host ID engine which may pull or retrieve information from the network address databases as necessary to obtain a durable host ID for other network security devices.

Generally, an artifact is a feature or data item that may be used to identify hosts. In some embodiments, artifacts may be multi-valued (e.g. a host may emit multiple different values of a multi-value artifact). In some embodiments, multi-value artifacts may include a host's MAC address (e.g. a single host may have a first wired MAC and/or a second wireless MAC). In some embodiments, multi-value artifacts may include long-lived HTTP cookies or long-lived identification tokens that may be used with cloud services.

In some embodiments, artifacts may be single-valued (e.g. an identifier of which each host as only one of the type). In some embodiments, single-valued artifacts may include a DHCP Host Name; a NetBIOS Host Name; multi-cast domain name system (MDNS) Host Name; a domain name system (DNS) name; and/or a system identification number, such as an anti-theft number, BIOS serial number, or other unique numbers used for identification or tracking purposes.

In some embodiments, artifacts may be considered ambiguous if they do not uniquely identify a host. Ambiguous artifacts may include: DHCP host name, NetBIOS host name or MDNS host name. For example, if two host devices are of the same type (e.g. host device 1 is an iPhone, and host device 2 is also an iPhone), the two host devices may have the same MDNS host name (e.g. "iPhone"). In some embodiments, artifacts may be unambiguous in that they can positively identify a host. Examples of unambiguous may include: MAC Address and identification tokens, specifically chosen HTTP cookies.

In some embodiments, the artifacts may contribute to a hierarchy or preference. The preference among artifacts may decide what is shown to the user interface or may be used to make decisions in the manner the artifacts are collected or updated. For instance, if a host ID signature contains both a NetBIOS host name and a DHCP host name, the preference may dictate that the NetBIOS host name be displayed as the identifier for the host.

As one of ordinary skill in the art appreciates, the above list of example artifacts and protocols is not exhaustive. Others may also be used; for example, artifacts provided by authentication protocols, error reporting systems, and other protocols. Further, artifact values are not limited to Host Names or MAC addresses. Additional artifact value types such as user names, system IDs, software license numbers, and/or a device's operating system version may also be utilized.

In some embodiments, some or all of the durable host IDs may be stored and maintained in the signature database 320. In some embodiments, data about which network addresses were associated with which durable host ID and at what times the association was in effect may be stored and maintained in the address database 316 as a mapping data structure. In some embodiments, the host ID engine provides programmatic means to extract durable host IDs and/or the host network address data by a implementing a query agent 312. In these embodiments, the query agent may utilize programmatic and network-based mechanisms, such as SQL queries or REST (Representational State Transfer) APIs (Application Programming Interfaces), to retrieve host identification data (e.g. durable host IDs, and the network addresses to which they corresponded at certain points in time).

Figure 6:
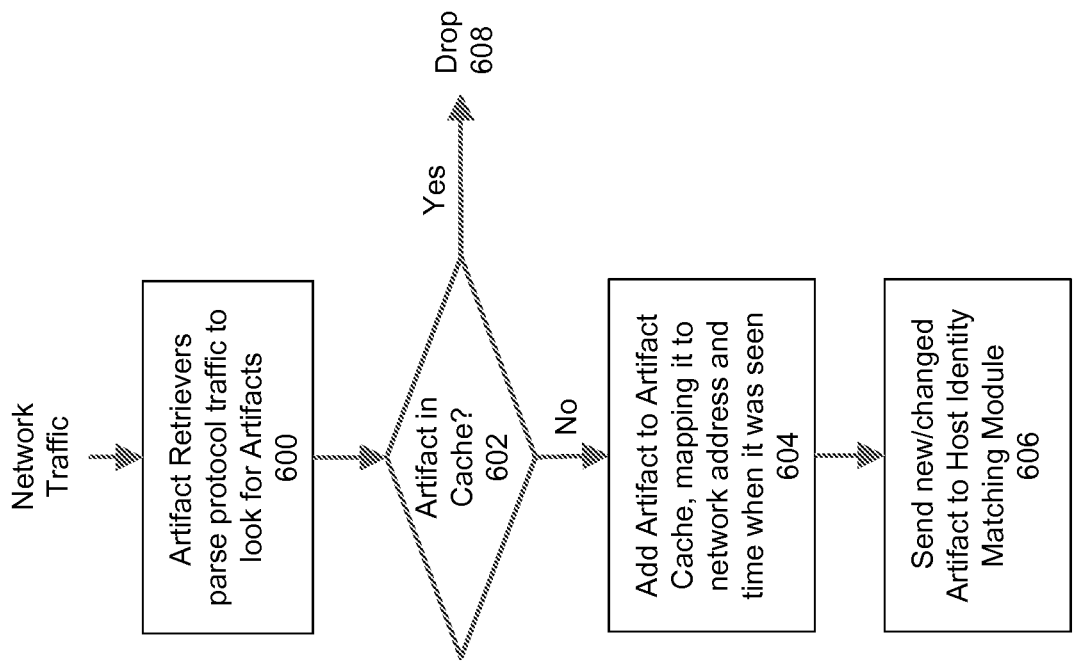
FIG. 6 shows a flow for processing artifact data using an artifact cache.

FIG. 6 shows a flow for processing artifact data using an artifact cache. In some embodiments, at 600, artifacts may be collected by artifact extractors that parse network protocol traffic and extract artifacts. In some embodiments, the artifact extraction units (e.g. 306a-306n) do not actively participate or communicate with the machines generating or communicating using the artifacts (e.g. hosts 112-118). Rather, in those embodiments, the artifact extractors passively examine the network traffic (e.g. session datasets or individual network packets) to obtain the artifact data.

In some embodiments, at 602, once an artifact extractor detects an artifact (e.g. a MAC address), the artifact extractor may check the artifact cache to see whether the cache already contains the artifact. At 608, if the cache does in fact contain the artifact, the artifact is dropped and this artifact is not processed further. In this way, unnecessary load on the host ID engine 106 may be avoided by ignoring already collected artifacts (e.g. if a host sends collect-able artifacts frequently, only a subset may be collected and the rest ignored if the same). Further, in this way, the store of artifacts in the cache also acts as a real-time status of all the recent artifacts seen (e.g. collected) up to a current detection time.

At 604, if the artifact is new to the cache the artifact may be stored in the cache. In some embodiments, the artifact is stored with its corresponding network address data and the time when it was seen (e.g. detected/extracted) and the lifetime it should spend in the cache. In some embodiments, multi-valued artifacts may be appended to a list of artifacts for the same network address in the artifact cache. In some embodiments, new single-valued artifacts may overwrite an existing single-valued artifact value in the artifact cache. At 606, a set of newly collected artifacts from the network address may then be created and sent to the host identity matching module.

Figure 7:
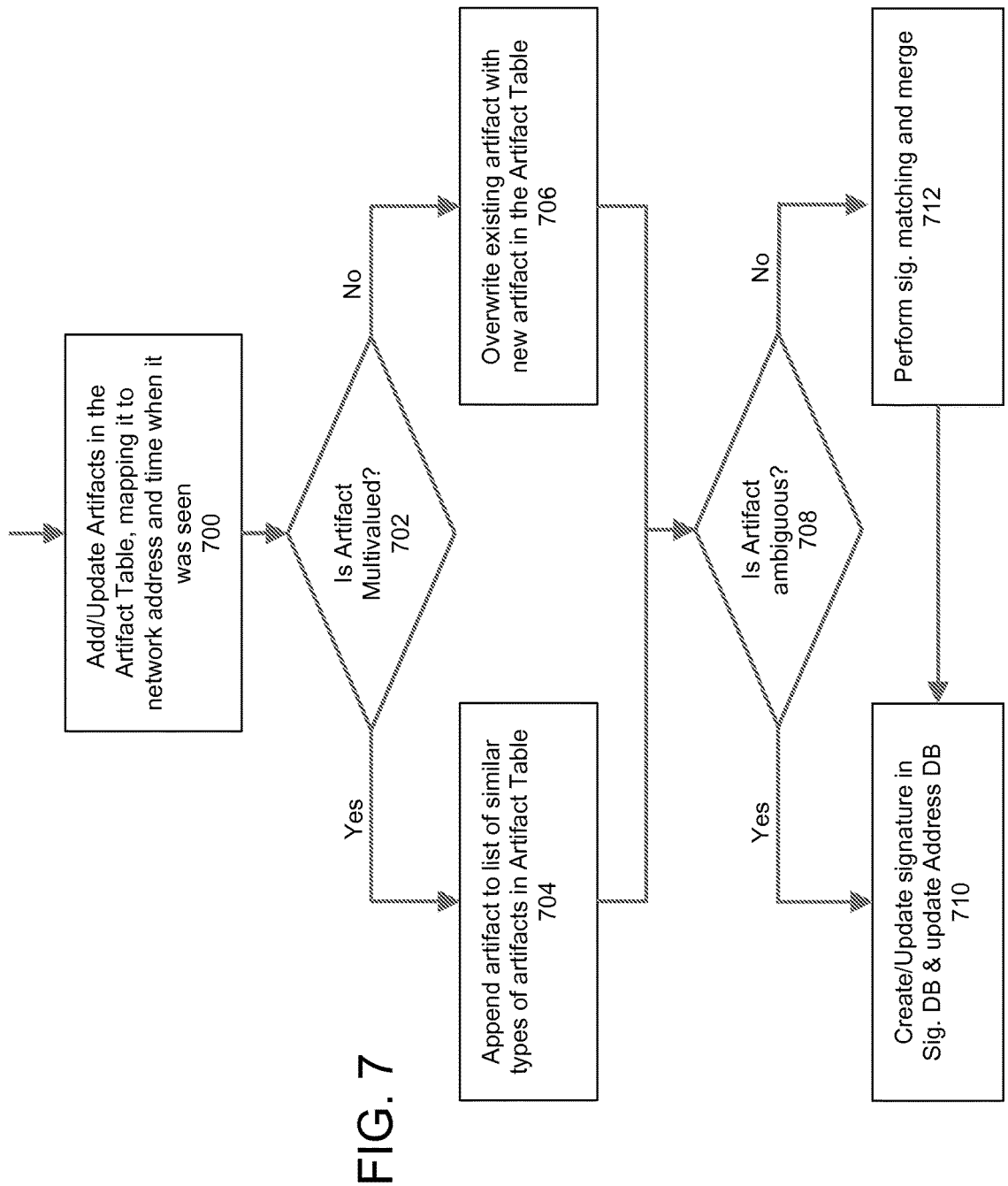
FIG. 7 shows a flow for an approach for processing artifacts using an artifact table, as according to some embodiments.

FIG. 7 shows a flow for an approach for processing artifacts using an artifact table, as according to some embodiments. At 700, new artifacts received from the artifact cache may be bucketed (e.g. aggregated, categorized)

and mapped against network addresses and times when the artifacts were received in an artifact table. In some embodiments, the mapping or artifact table contains the set of artifacts that have been detected in relation to a network address and signature data to which the network address correspond to or belong. In some embodiments, the artifact table comprises a table with artifacts correlated to a network address at a given moment in time.

At 702, a check may be performed to determine if the newly received artifact is multi-valued or single-valued. At 704, if the artifact is multi-valued, the artifact may be appended to the list of similar artifacts. At 706, if the artifact is single-valued, the artifact may overwrite the previous value of the artifact in the artifact table.

At 708, the artifact may be checked to determine if it is an ambiguous artifact, (e.g. one that may have been observed in multiple durable host IDs). At 710, if the artifact is ambiguous, the artifact may be added to the signature database record (e.g. matching collection of artifacts) corresponding to the host to which the artifact corresponds, thereby updating the host's durable host ID with the latest received ambiguous artifact value. However, if a host signature for the host does not already exist, a new host signature may be generated for the host and the artifact value may be added to it. In this way, the new host signature may be used as placeholder to receive further artifacts associated with the network address. In some embodiments, the address database may also be updated with a mapping of the host's network address to its host signature. In this way, the host ID engine provides the current best guess (e.g. identification with a confidence percentage) for what host is currently utilizing the network address that corresponds to the artifact. At 712, unambiguous artifacts may be used to identify multiple durable host IDs that are duplicates. In some embodiments, once duplicates are found the duplicate durable host ID sets may be merged.

In some embodiments, subsequent artifacts follow the same logic and may be added to the same host signature. Thus, the signature may get richer and richer with data and details as time progresses and new artifacts are received. In some embodiments, artifacts associated with a different network address at a different time may also follow the same logic and may also be assigned to the same host signature if there is at least one unambiguous artifact that the signatures of the two network addresses in the artifact table share. For instance, this scenario may occur when a host is active on two network interfaces near the same time (e.g. one wired, another wireless) or when two host ID signatures created at different times in different parts of the network are found to actually be the same host.

Figure 8:
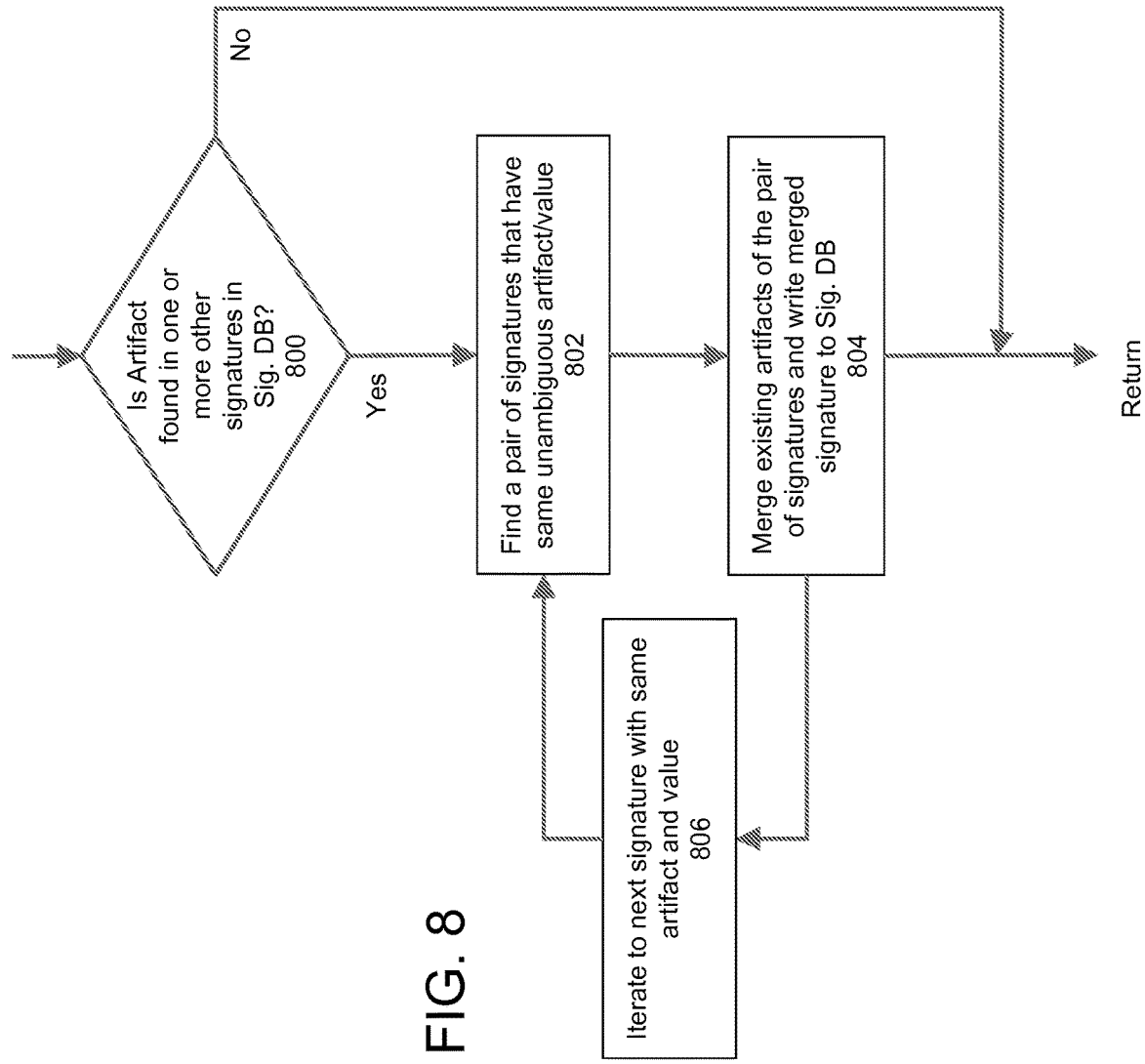
FIG. 8 shows a flow chart for an approach for detecting existing artifacts in more than one host ID signature, as according to some embodiments.

FIG. 8 shows a flow chart for an approach for detecting whether two host ID signatures represent the same host, as according to some embodiments. At 800, a check may be performed to see if a detected artifact is present in any other signature(s) in the signature database. At 802, for every additional signature in which the same unambiguous artifact is present, the current signature and the signature containing the matching unambiguous artifact are merged into a single signature, which may be written to the signature database at 804. In some embodiments, the merging process continues until all signatures with the same unambiguous attribute have been similarly processed at 806.

In some embodiments, signatures in the signature database may be distributed over a network to form a distributed signature database. For instance, a first network may have a dedicated host ID engine and may share or merge its signature database with a second host ID engine dedicated to a second network different than the first. In some embodiments, on each durable host ID signature creation, update or deletion, the corresponding signatures on the remote databases (e.g. in the second host ID engine) may also be created, updated or deleted. In this way, remote host ID engines may acquire host identification data even through a given host may not currently be on the remote network. The presence of a distributed signature database allows for hosts moving to remote locations on the network to be reliably identified.

As the signature database stores signature data and/or updates its existing data, the database gets richer, more detailed and provides increasingly accurate host IDs. As the address database is updated, it can provide a historical view of the movement of network addresses from signature to signature. Similarly, the network address database can identify which network addresses a particular Host ID Signature was associated with across a period of time. In this way, this network address database may be used retroactively track history of host's presence on the network and also enable identification and naming of a given host even if the host is moving around in the network or moving to and from a new network.

As explained, in this way, the Host ID engine maintains a signature for each host on the network, and it can also determine that a signature (and hence a host) has a particular network address during a particular period of time. This enables network security appliances (or a system which needs to track behavior of hosts over time) to track and describe behavior that spans a longer period of time and for which the information supplied by the network (which may be dynamic in nature) is insufficient. Some embodiments described above are completely passive and also rely on multiple artifacts. As such, the host ID engine makes it particularly difficult for adversaries (e.g. malicious entities attacking a network) to detect the host ID engine's presence. Further, the host ID engine makes it particularly difficult for attacking entities to spoof another host's identity because multiple artifacts can be used to track the host regardless of whether they move to a different network address or change networks.

Figure 9:
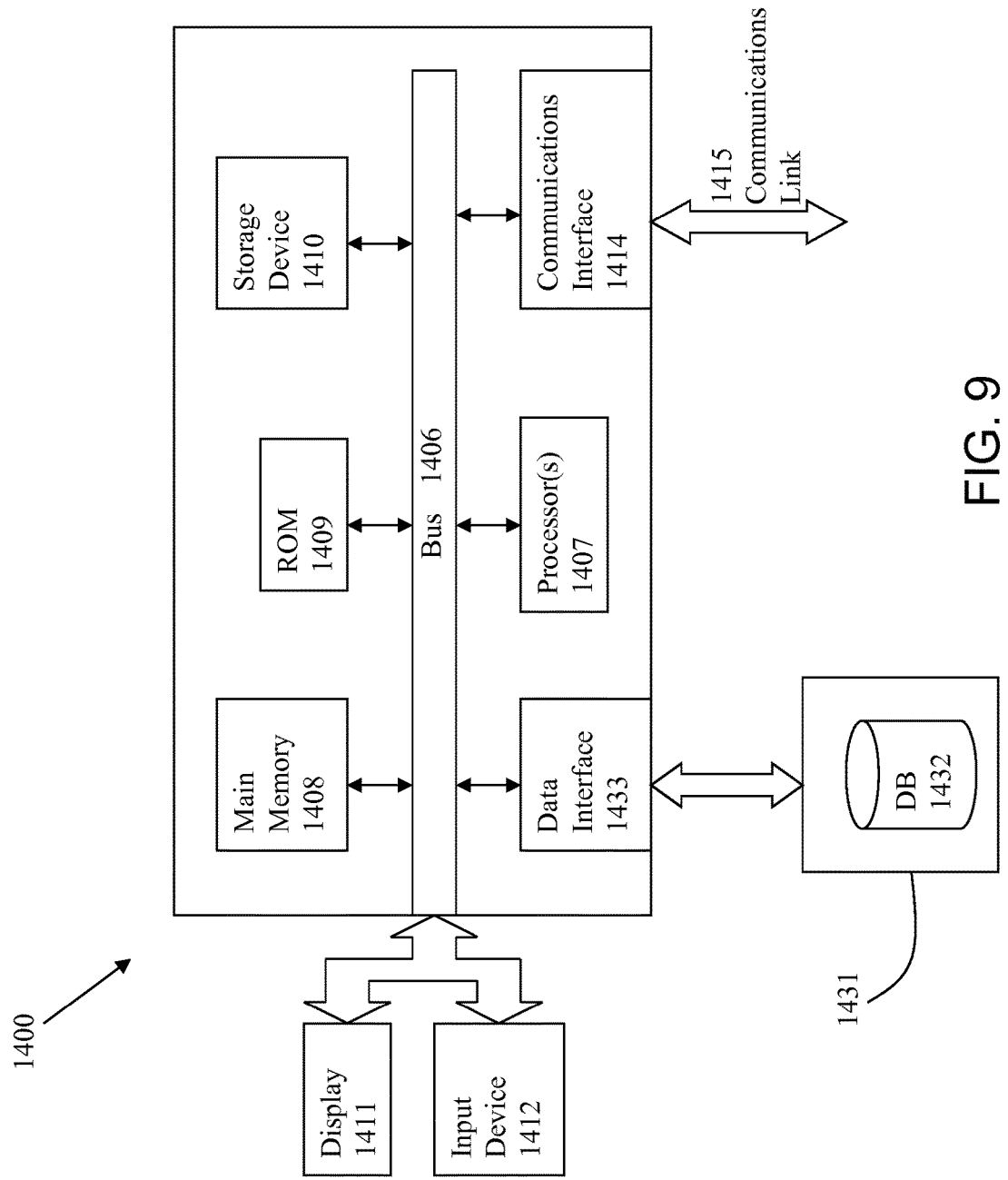
FIG. 9 illustrates a block diagram of an illustrative computing system 1400 suitable for implementing an embodiment of the present invention for performing intrusion detection.

FIG. 9 illustrates a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for generating network host identification data, comprising:
   extracting one or more artifact data items from network traffic, the network traffic corresponding to communications between one or more hosts;
   generating durable host identification data, the durable host identification data corresponding to a collection of the one or more artifact data items that identify a host across different network addresses;
   storing the durable host identification data in a signature database; and
   storing one or more network addresses and time periods in a network address database, the one or more network addresses corresponding to the durable host identification data, the time periods corresponding to the one or more network addresses that were in use by the one or more hosts.

2. The computer-implemented method of claim 1, further comprising
   implementing a table to match data from the signature database and the network address database, the table comprising a mapping between the durable host identification data and the one or more network addresses to track the one or more hosts.

3. The computer-implemented method of claim 1, wherein the the one or more artifact data items are multi-valued artifacts or single-valued artifacts.

4. The computer-implemented method of claim 3, wherein multi-valued artifacts are appended to matching multi-valued artifacts.

5. The computer-implemented method of claim 3, wherein new single-valued artifacts overwrite matching existing single-valued artifacts.

6. The computer-implemented method of claim 1, wherein artifacts are unambiguous artifacts or ambiguous artifacts.

7. The computer-implemented method of claim 6, wherein ambiguous artifacts for a host are added to a matching collection of artifacts for the host in the signature database and wherein unambiguous artifacts are used to detect one or more duplicate collection of artifacts.

8. The computer-implemented method of claim 1, further comprising:
   receiving network traffic through a network component by creating a copy of the network traffic for analysis, the network traffic being parsed into one or more session datasets comprising unidirectional flows generated by one or more hosts.

9. The computer-implemented method of claim 8, further comprising:
   merging one or more duplicate collection of artifacts.

10. The computer-implemented method of claim 1, further comprising:
    responding to requests for network address to durable host identification mapping data using a query agent.

11. The computer-implemented method of claim 1, further comprising:
    distributing the signature database across a plurality of different networks, the plurality of different networks comprising a first network and a second network that is different from the first network; and
    identifying a host on the first network using durable host identification data generated on the second network.

12. The computer-implemented method of claim 1, further comprising:
    organizing the one or more artifact data items into clusters that corresponds to the network address for the host, wherein the one or more artifact data items corresponds to the host.

13. A system for generating network host identification data, comprising:
    a computer processor to execute a set of program code instructions;
    a memory to hold the set of program code instructions, in which program code instructions comprises program code to perform:
    extracting one or more artifact data items from network traffic, the network traffic corresponding to communications between one or more hosts;
    generating durable host identification data, the durable host identification data corresponding to a collection of the one or more artifact data items that identify a host across different network addresses;
    storing the durable host identification data in a signature database; and
    storing one or more network addresses and time periods in a network address database, the one or more network addresses corresponding to the durable host identification data, the time periods corresponding to the one or more network addresses that were in use by the one or more hosts.

14. The system of claim 13, further comprising
implementing a table to match data from the signature database and the network address database, the table comprising a mapping between the durable host identification data and the one or more network addresses to track the one or more hosts.

15. The system of claim 13, wherein the one or more artifact data items are multi-valued artifacts or single-valued artifacts.

16. The system of claim 15, wherein multi-valued artifacts are appended to matching multi-valued artifacts.

17. The system of claim 15, wherein new single-valued artifacts overwrite matching existing single-valued artifacts.

18. The system of claim 13, wherein artifacts are unambiguous artifacts or ambiguous artifacts.

19. The system of claim 18, wherein ambiguous artifacts for a host are added to a matching collection of artifacts for the host in the signature database.

20. The system of claim 18, wherein unambiguous artifacts are used to detect one or more duplicate collection of artifacts.

21. The system of claim 20, in which the program code instructions further comprises program code to merge one or more duplicate collection of artifacts.

22. The system of claim 13, in which the program code instructions further comprises program code to respond to requests for network address to durable host identification mapping data using a query agent.

23. The system of claim 13, in which the program code instructions further comprises program code to distribute the signature database across a plurality of different networks, the plurality of different networks comprising a first network and a second network that is different from the first network; and identify a host on the first network using durable host identification data generated on the second network.

24. The system of claim 13, further comprising:
organizing the one or more artifact data items into clusters that corresponds to the network address for the host, wherein the one or more artifact data items corresponds to the host.

25. A computer program product embodied on a non-transitory computer readable medium, the non-transitory computer readable medium having stored thereon a sequence of instructions which, when executed by a processor causes the processor to execute a method for generating network host identification data, the method comprising:

extracting one or more artifact data items from network traffic, the network traffic corresponding to communications between one or more hosts;
generating durable host identification data, the durable host identification data corresponding to a collection of the one or more artifact data items that identify a host across different network addresses;
storing the durable host identification data in a signature database; and
storing one or more network addresses and time periods in a network address database, the one or more network addresses corresponding to the durable host identification data, the time periods corresponding to the one or more network addresses that were in use by the one or more hosts.

26. The computer program product of claim 25, further comprising
implementing a table to match data from the signature database and the network address database, the table comprising a mapping between the durable host identification data and the one or more network addresses to track the one or more hosts.

27. The computer program product of claim 25, wherein the one or more artifact data items are multi-valued artifacts or single-valued artifacts.

28. The computer program product of claim 25, wherein the non-transitory computer readable medium further comprises instructions which, when executed by the processor, causes the processor to execute the method further comprising:
responding to requests for network address to durable host identification mapping data using a query agent.

29. The computer program product of claim 25, wherein the non-transitory computer readable medium further comprises instructions which, when executed by the processor, causes the processor to execute the method further comprising:
distributing the signature database across a plurality of different networks, the plurality of different networks comprising a first network and a second network that is different from the first network; and
identifying a host on the first network using durable host identification data generated on the second network.

30. The computer program product of claim 25, further comprising:
organizing the one or more artifact data items into clusters that corresponds to the network address for the host, wherein the one or more artifact data items corresponds to the host.

* * * * *